UNITED STATES PATENT OFFICE.

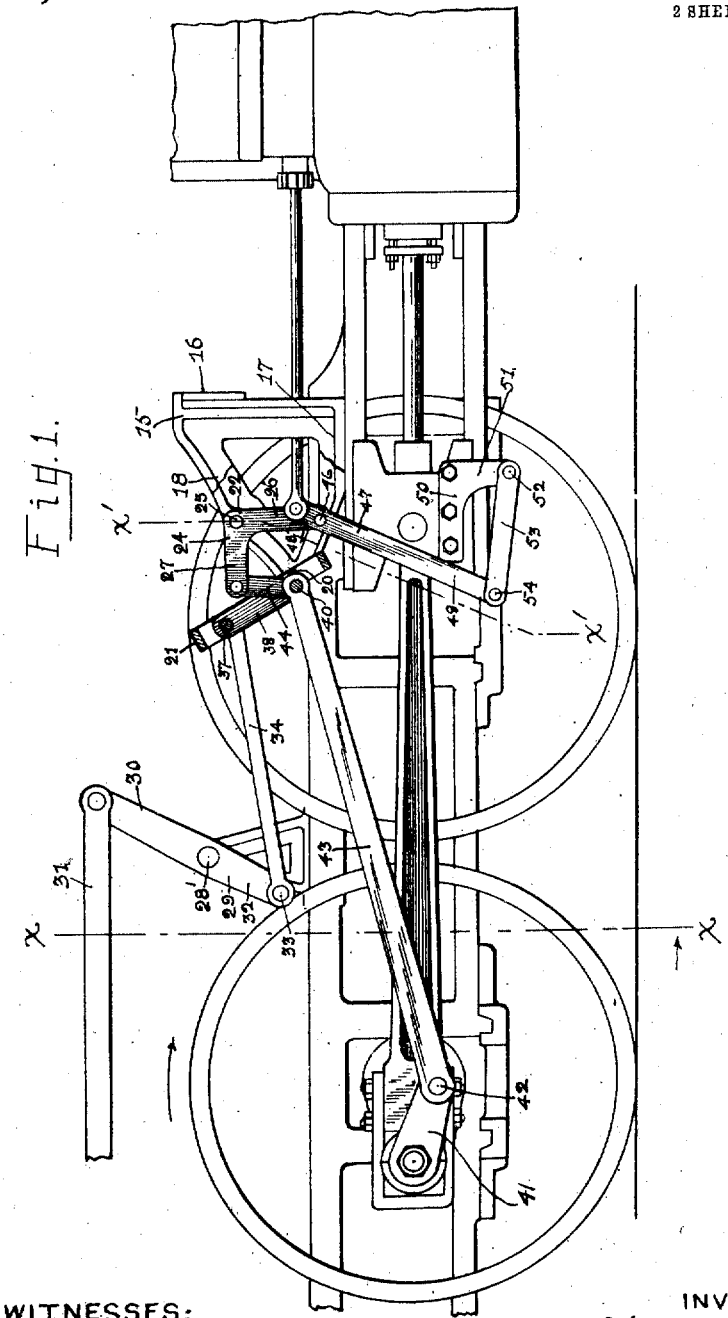

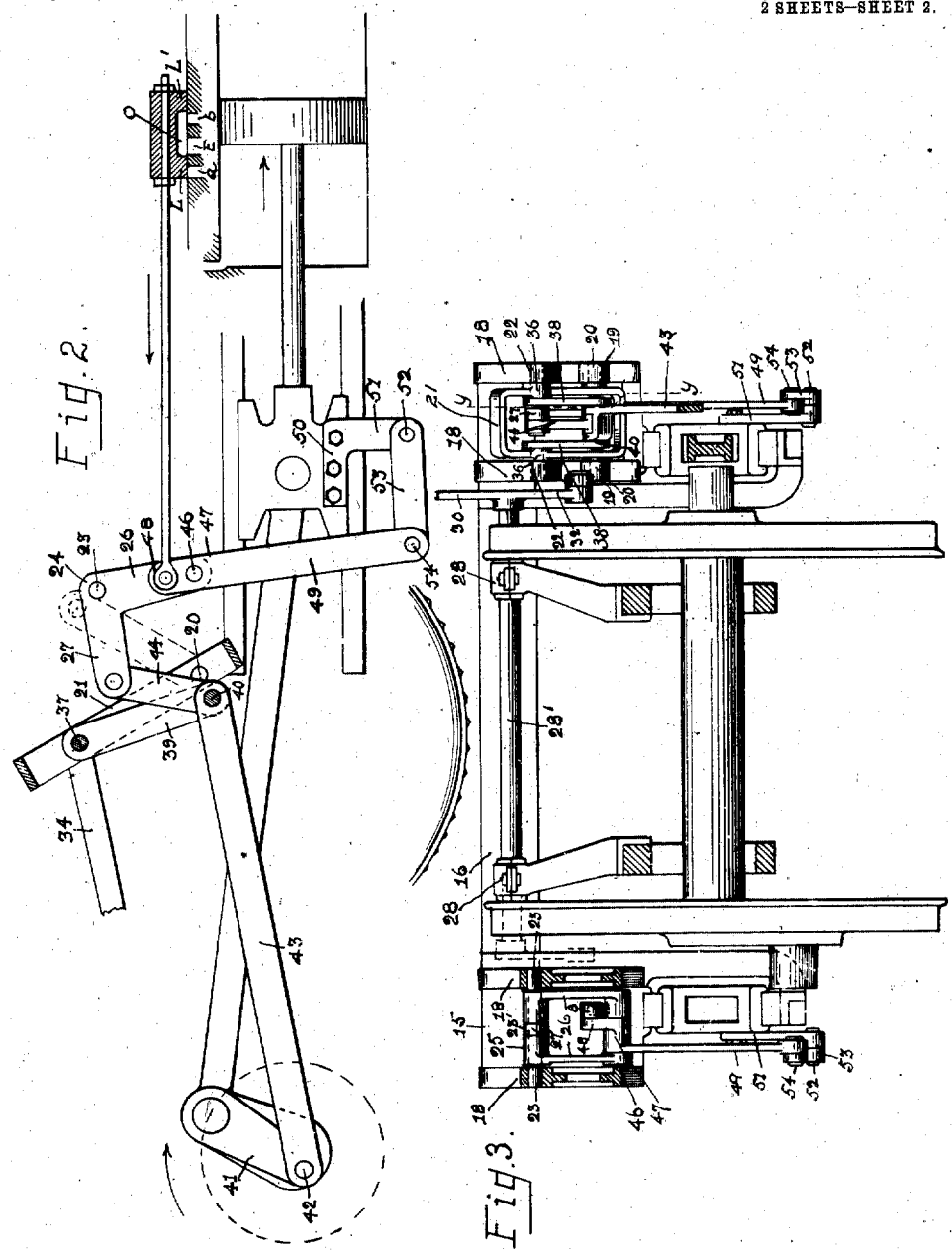

ABNER D. BAKER, OF SWANTON, OHIO.

VARIABLE-CUT-OFF VALVE-GEAR FOR ENGINES.

1,008,405.   Specification of Letters Patent.   Patented Nov. 14, 1911.

Application filed March 20, 1909. Serial No. 484,788.

*To all whom it may concern:*

Be it known that I, ABNER DE HAVEN BAKER, a citizen of the United States, residing at Swanton, in the county of Fulton and State of Ohio, have invented a new and useful Improvement in Variable-Cut-Off Valve-Gear for Engines, of which the following is a specification.

My invention relates to a variable cut-off valve gear for locomotives and traction engines, and has for its object to provide for engines of the classes described, a simple, light, durable and efficient valve gear of the kind, that is adapted, (1) to adjust the length of valve stroke to vary the extent of port openings and point of cut-off; and (2) to operate the valve at alternately quick and slow speeds during its stroke, to effect (*a*) quick and full opening of the admission port at the beginning of each stroke of the piston to the extent the established valve stroke permits and maintain it so fully open to near the point of cut-off; (*b*) quick cut-off at equal distances of piston travel on the forward and backward strokes; and (*c*) quick release at the end of each stroke of the piston, of steam admitted during the stroke, and free continuation of its release during the next succeeding stroke.

A further object is to provide a valve gear of the kind described, that is unaffected by vibration caused by running over inequalities of track or surfaces.

I accomplish these objects by the construction, combination and arrangement of parts as hereinafter described and illustrated in the drawings, in which—

Figure 1 is a broken away view in side elevation of a locomotive frame, equipped with a valve gear constructed in accordance with my invention. For greater clearness parts of the gear frame are broken away, and parts of the gear are shown in section on line Y—Y of Fig. 3. Fig. 2 is a diagrammatic view showing the relative positions of the parts at the point of cut-off of the forward stroke, and Fig. 3 is a cross section of Fig. 1, which as to the right hand gear is on line $x$—$x$ and as to the left hand gear is on line $x'$—$x'$ of Fig. 1.

It is to be understood that each cylinder of the engine is provided with a valve gear constructed and operating as hereinafter described, and that on the guide bars of each cylinder is mounted a frame 15 in which the working parts of its gear are journaled, the two frames being cross-connected by the bar 16.

Each frame 15 comprises a base and front portion 17, from which extend parallel and rearward the integral bracket frames 18, having the alined bearings 19 in which are pivotally mounted the trunnions 20 of a yoke 21, and the alined bearings 22 in which are pivotally mounted the trunnions 23 of a bell crank 24, comprising the sleeve 25 the parallel arms 26 radial to the axle, and the arm 27 radial to the sleeve 25 at a right angle to the arms 26. Preferably the trunnions 23 are the end portions of an axle 23', fitted tightly into an axial bore through the sleeve 25 of the bell crank 24, thus formed.

The reach rod 31 is connected by a lever 30 to a link rod 34, which is pivotally connected at the opposite end to the yoke 21 by the wrist pin (not shown), whereby the yoke is made adjustable by the reach rod at various angles to vertical lines through the axis of the trunnions 20. The yoke 21 is provided near its top portion with the alined bearings 36, in which are journaled the trunnions 37 of the parallel arms 33 of the radius rocker 39, comprising the arms 38 and the radius rocker pin 40.

The free end of the arm 27 of the bell crank 24 is connected by the link bar 44 to the forward end of the eccentric rod 43, which, at its opposite end, is connected to the pin 42 of the return crank 41. The radius rocker 39 is connected by its pin 40 to the link bar 44, and the radial distance of the pin 40 from the trunnions 37 of the radius rocker is equal to the radial distance of the trunnions 37 from the trunnions 20 of the rocker yoke 21.

The free end portions of the parallel arms 26 of the bell crank 24 are cross connected by a pivot pin 46 upon which is pivotally mounted a lever 47, the upper and short arm 48 of which is provided with a wrist pin to which is pivotally connected the free end portion of the valve rod. The longer arm 49 of the lever 47 extends downward below the guide bars of the cross head.

The lower end of the lever 49 is connected by a link bar 53 to the cross-head, and combines the motion of the cross head with that of the bell crank, instead of that of the radius rod as in the Walschaart.

Thus constructed and connected, in whatever position the rocker yoke 21 is established by the reach rod, whether for for ward or backward travel, the pin 40 of the radius rocker 39, in its reciprocation by the eccentric rod, travels through an arc of equal length and of equal radius but having a different center from every other arc, and these arcs intersect each other at a common central point in a line axial to the trunnions 20 of the rocker yoke. The lateral distance of travel of the pin 40 varies according to the angle of each arc to a horizontal line drawn through the common intersecting point of the arcs at right angles to a line axial to the trunnions 20, and the motion thereby imparted to the valve is indirect through the link 44, the bell crank 24 and the arm 48 of the lever 47, and varies the length of the valve stroke according to the variation in the lateral travel of the pin 40. The speed of the valve movement produced by the eccentric rod is a reproduction of the differential speed of reciprocation of the eccentric rod according to the law of crank reciprocation, except as modified by the lever 47. The movement of the valve by the cross head through the link 52 and the lever 47,—except as modified by the bell crank 24,—is in direct reverse of the movement of the piston, and in speed is reduced below that of the cross head in the proportion of the length of the arm 48 to the arm 49 of the lever, the distance of movement of the valve by the lever 47 being the length of the lap and lead of the valve. The combined movement of the valve by the eccentric rod and lever 47 relative to a stroke of the piston is as follows:

At the beginning of a piston stroke the valve is in he center of its stroke, and is being moved by the eccentric rod while passing one of its 90° centers at its highest speed, which causes the valve to fully open the admission port (to the extent the parts are adjusted to open it by the reach rod) before the piston has more than started on its stroke. By the time the admission port is fully open, the arm 49 of the lever 47 is moving the short arm 48 in the opposite direction to that which the fulcrum 46 of the lever is being moved indirectly by the eccentric rod, and the two movements are thereby almost neutralized, and the valve pauses and comes very slowly to the end of its stroke, at which time the eccentric rod is passing a dead center, and traveling at its slowest speed, while the lever 49 is traveling at its highest speed, and quickly reverses the valve stroke and closes the admission port, thereby producing cut-off, after which the valve, now slowly moved in the same direction by both the eccentric rod and the lever,—one gradually increasing from its slowest speed and the other rapidly diminishing from its highest speed,—causes the valve to pause or dwell until the eccentric rod again reaching its highest speed quickly moves the valve to open the exhaust port, and very slightly open the opposite admission port as the piston stroke comes to an end, and then fully opens it as the new piston stroke begins. It will be seen also that the alternating effect of the eccentric rod and the lever 47 on the valve movement, is to produce quick movement of the valve at the beginning, ending, and intermediate, the beginning and ending of each piston stroke, and slow movement in the intervals between the quick movements. The quick movements at the beginning and ending of a piston stroke are produced as aforesaid by the eccentric rod while passing its 90° centers, and while the piston is at the end of a stroke, and the lever 47 is changing direction and moving slowly,—the shifting fulcrum of the lever 47, permitting such quick movement of the eccentric rod without resistance from the lever. The quick movement of the valve intermediate the beginning and ending of the piston stroke aforesaid, which effects the cut-off, is produced by the lever 47 while moving at its highest speed past the center of its arc of travel, and when the eccentric rod is on its dead centers and slowly moving the valve in the same direction as the short arm of the lever is moving it,—the shifting fulcrum of the lever permitting quick movement of the short arm of the lever without producing resistance to the lever or the eccentric rod.

In the intervals between the quick movements of the valve, the rapidly diminishing speed of the eccentric rod in the one interval and the rapidly diminishing speed of the lever 47 in the other, as the cranks of the eccentric and connecting rods respectively and alternately approach their dead centers, produces a quick reduction in the speed of the valve,—in the one interval, after the valve has fully opened the port to the established extent,—and causes a pause or dwell of the valve that maintains the full admission of steam to near the point of cut-off, and, in the other interval,— after the quick cut-off produced by the lever 47 as aforesaid,—causes a like pause or dwell of the valve until near the end of the piston stroke, when the quick movement of the eccentric rod as it passes its 90° centers produces a quick release of the steam admitted during the stroke and very slightly opens the admission port for the next stroke as the piston stroke ends. While these movements of the eccentric rod and the lever are apparently conflicting, they are in fact perfectly harmonious and produce no resistance the one to the other,—the shifting fulcrum of the lever 47 being the medium of harmonious blending and transference of the movement of the valve from one to the other in alternation, both in producing the quick and the slow movements of the valve, the quick movements being alternately produced by the eccentric rod and the lever as they alternately pass their 90° centers, and the slow movements being alternately produced by the eccentric rod and the lever 47 as they alternately approach their dead centers. My gear also corrects the unequal distances of cut-off from the beginning of a stroke, between the forward and backward strokes of the piston, which has heretofore been incident to engines, and which, as is well understood, is due to a difference of speed in the travel of the piston in the two strokes that is produced by the angularity of the connecting rod.

My gear effects equality of distance of cut-off by reason of the fact that the arm 49,—which travels in exact speed unison with the piston and tends, during the last half of the valve stroke, to move the valve in the opposite direction from that which the eccentric rod is moving it, but which tendency is neutralized as aforesaid by the shifting of the fulcrum 46 in the direction of its movement,—takes effect and produces cut-off as soon as the valve has reached the end of its stroke, by reversing the movement of the valve, and, if the speed of the piston is greater during one stroke than the other, cut-off will occur proportionately earlier, by reason of such increased speed, and the distance of piston travel when cut-off occurs is thereby equalized. It will also be seen that the length of valve stroke produced by the eccentric rod, and the extent of port opening will be varied and increased in proportion to the distance the rocker 21 is moved through its arc by the reach rod in either direction from a vertical position, and that in such central position, the eccentric rod,—by reason of the arc of travel of the pin 40 of the radius rocker 39, being nearly horizontal,—produces only slight movement of the bell crank 24, and that, at equal distances from said vertical position, in either direction the arc of travel of the pin 40 will be at equal angles to the horizontal, and will produce equal increases of lateral movement of the eccentric rod, and thereby through the link 44 and the bell crank 24 produce equal valve movement, on the reverse as on forward movement. It is further apparent that while the length of valve stroke and distance of port opening varies as described, the distance of movement of the valve by the lever 47 remains constant, and cut-off occurs at less and less distances of piston travel as the extent of port opening is diminished.

The valve gear shown and described is unaffected in its operation of the valve by upward and downward movement of the driving wheels produced in running over inequalities of the track or uneven surfaces, by reason of the counter-acting effect produced by the lever 47, to any abnormal action of the eccentric and connecting rods arising from such disturbance of the normal relation of those parts to the valve and the piston.

By the construction, arrangement and combination of parts shown and described, I have provided a valve gear that with few and simple parts produces equal and perfect action of the valve during the forward and backward strokes of the piston, however the cut-off may be varied, either on the forward or backward movement of the engine.

What I claim to be new is—

1. In a variable cut-off valve gear for locomotives, the combination with the main frame, eccentric rod, slide valve and cross head, of a support mounted on the frame, a bell crank journaled on the support, a link connecting one arm of the bell crank to the forward end of the eccentric rod, a lever fulcrumed on the other arm of the bell crank, a stem connecting the valve with the lever near its fulcrum, a link connecting the cross head to the lever at a proportionally greater distance from the fulcrum than the connection of the stem, a member mounted on the support and adjustable thereon through an arc, a rocker pivotally connected at one end to the adjustable member and at the other end to the bell crank link, the radial distance from said first to said second pivotal connection of the rocker being equal to the radial distance of its first pivotal connection from the center of the arc of movement of the adjustable member, and means to adjust and establish the adjustable member at different points in the arc of its movement.

2. In a variable cut-off valve gear for locomotives, the combination with the main frame, eccentric rod, slide valve and cross head, of a support mounted on the frame, a bell crank journaled on the support, a link connecting one arm of the bell crank to the forward end of the eccentric rod, a lever fulcrumed on the other arm of the bell crank, to form a short arm and a longer arm, a stem connecting the short arm of the lever to the slide valve, a link connecting the longer arm to the cross head, a primary rocker journaled on the support and adjustable through an arc, a return rocker pivotally connected at one end to the free end of the primary rocker and at the other end to the bell crank link, the radius of the return rocker being equal to the radius of the primary rocker, and means to adjust and establish the primary rocker in different positions radial to its axis.

3. In a reversing variable cut-off valve gear for locomotives, the combination with the main frame, eccentric rod, slide valve and cross head, of a support mounted on the main frame, a bell crank journaled on the support, said bell crank having an arm that is provided with and connected by a link bar to the forward end of the eccentric rod, and a pair of arms that are cross connected at their free ends by a bearing pin, a lever fulcrumed on the bearing pin, said lever having a short arm and a longer arm, a valve rod connecting the short arm of the lever to the valve, a link bar connecting the longer arm to the cross head, a rocker yoke having side trunnions journaled near one end on the support, and having alined bearings in its sides near its opposite end, means to adjust and establish the yoke in different positions radial to its trunnions, and a radius rocker having side trunnions journaled in the side bearings of the yoke, and adapted to swing on its trunnions through the yoke, said radius rocker being pivotally connected at its opposite end to the bell crank link, at a radial distance from the trunnions of the radius rocker equal to the radial distance of said trunnions from the trunnions of the rocker yoke.

4. In a variable cut-off valve gear for locomotive and traction engines, the combination with the driving wheel, crank pin for the connecting rod, and cross head of the engine, of a support, a rock yoke having alined trunnions mounted on the support, a reach rod adapted to adjust the rock yoke at various angles to its trunnions, a radius link pivoted to the yoke to swing through the yoke in various arcs according to the angle of adjustment of the yoke, a return crank fixedly mounted on the crank pin and having a pin eccentric to the axis of the driving wheel, an eccentric rod connecting the eccentric pin of the return crank with the radius link, a bell crank pivoted to the support, a link connecting one arm of the bell crank with the radius link, a lever fulcrumed on the other arm, said lever having a short arm pivoted to the stem of the valve, and a longer arm linked to the cross head, substantially as set forth.

In witness whereof I have hereunto signed my name in the presence of two subscribing witnesses, this 8th day of March, 1909.

ABNER D. BAKER.

In presence of—
MARK WINCHESTER,
M. S. SMITH.